Figure 1:
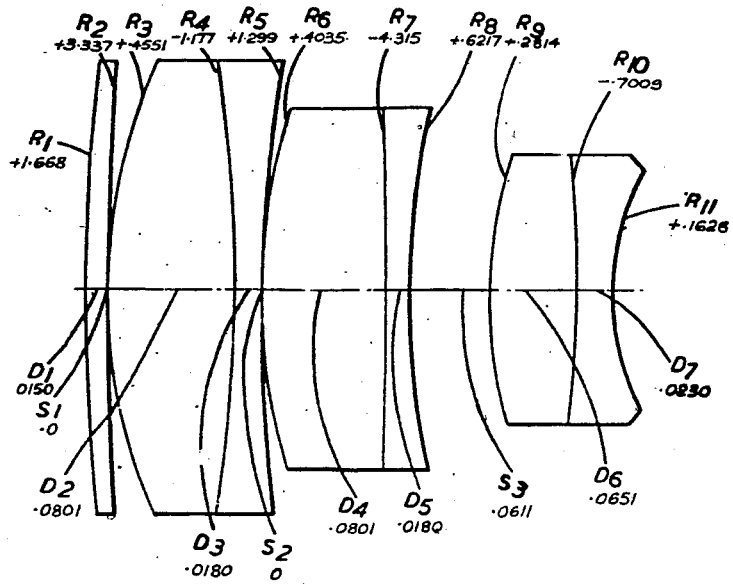

Oct. 23, 1945.  A. COX  2,387,497

OPTICAL OBJECTIVE

Filed June 12, 1944

Inventor
A. Cox
By Emmy Holcombe & Blau
Attorneys

Patented Oct. 23, 1945

2,387,497

UNITED STATES PATENT OFFICE 2,387,497

OPTICAL OBJECTIVE

Arthur Cox, Leicester, England, assignor to Taylor, Taylor & Hobson Limited, Leicester, England, a company of Great Britain Application June 12, 1944, Serial No. 539,872
In Great Britain May 3, 1943

27 Claims. (Cl. 88—57)

This invention relates to optical objectives of the kind known as telephoto objectives which are corrected for spherical and chromatic aberrations, coma, astigmatism and field curvature, and in which the axial distance from the front surface of the objective to the back focal plane is materially less than in objectives of the conventional types of the same focal length and aperture. Such objectives usually comprise a convergent member disposed in front of and widely spaced from a divergent member, each member being composed of a group of two or more lens elements disposed close together and commonly (though not invariably) cemented together. It should perhaps be made clear that the "front" of the objective is to be understood as the side of the longer conjugate in accordance with the usual convention. In most such telephoto objectives the two members (whether having internal airgaps or not) are in meniscus form with their concave faces towards one another.

In order to provide correction for coma and astigmatism, in such objectives, there is usually strong under-correction of spherical aberration in the front member balanced by strong over-correction thereof in the rear member, with the result that there is considerable under-corrected zonal spherical aberration in the objective.

Improved zonal spherical aberration has however been obtained without detriment to the correction of the other aberrations by means of the invention forming the subject of the present applicant's copending United States of America patent application No. 466,033, filed Nov. 18, 1942, and which has become Patent No. 2,366,597, dated January 2, 1945, according to which the objective comprises two convergent members disposed in front of a divergent member, each of the three members being formed of two or more elements, the two axial air spaces separating the three members each being less than one-eighth of the equivalent focal length of the objective.

In such arrangement, the divergent rear member preferably has its front surface convex to the front and may be arranged in various ways. Thus this member may be compounded of two elements having a contact surface concave to the front, and in this case the mean refractive indices of the two elements preferably are each greater than 1.6 and differ from one another by less than .01.

Alternatively such contact surface may be convex to the front. The materials used for the two elements in this case preferably each have a mean refractive index greater than 1.6 and have Abbé V numbers differing from one another by more than 25.0. In one convenient arrangement of this kind the member may comprise a convergent meniscus element in front of a divergent meniscus element. Whether this arrangement is employed or not, the rear member preferably includes a convergent element made of a material having an Abbé V number less than 33.0.

In a further variant the rear member is compounded of three elements, and in this case the two contact surfaces are preferably both convex to the front. This modification affords greater latitude in the choice of the glasses used.

In all these alternative arrangements the rear surface of the divergent rear member preferably has a radius of curvature lying between .125 and .35 times the equivalent focal length of the objective.

It should be made clear that the terms "compounded" and "contact surfaces" are used herein whether or not the two cooperating surfaces between a pair of elements have exactly the same curvature and whether or not cement is actually employed to connect the surfaces with one another.

Each convergent member preferably includes a contact surface of negative power, and if such surface is cemented the difference between the mean refractive indices of the materials used for the elements on either side of such surface preferably lies between .04 and .30. In the front convergent member such contact surface is preferably concave to the front with a radius of curvature between 0.6 and 2.0 times the equivalent focal length of the objective. In the convergent second member the contact surface preferably has radius of curvature not less than the equivalent focal length of the objective if convex to the front and not less than half the equivalent focal length if concave to the front. The front surface of the front convergent member is preferably convex to the front with a radius of curvature between .45 and .75 times the equivalent focal length of the objective.

Each convergent member may be compounded of a convergent element and a divergent element, and in such case the convergent element is preferably made of a material having higher Abbé V number than that used for the divergent element. Alternatively, at least one of the convergent members may comprise three elements.

It is especially convenient in some instances to employ an alkaline halide crystal as the material of which one of the divergent elements of the objective is made, and in one arrangement one of the convergent members is in the form of a cemented triplet comprising a convergent element in front of two divergent elements of which one is made of potassium iodide crystal.

The present invention is concerned with a development of the invention forming the subject of such patent, and likewise has for its object to provide improved zonal spherical aberration without detriment to the correction of the other aberrations.

The telephoto objective according to the present invention comprises a convergent system disposed in front of a rear compound divergent member, such convergent system consisting of two compound divergent members and one simple member, the three axial air spaces separating the four members each being less than one-eighth of the equivalent focal length of the objective. Whilst other arrangements may be employed, it will usually be preferable for the simple member in the convergent system to be convergent and to be disposed either in front of or between the two compound convergent members. Whatever the arrangement of its members, the convergent system should preferably have overall axial length lying between .15 and .35 times the equivalent focal length of the objective. In other respects several of the features of the objective described in the prior patent specification above mentioned are equally applicable to the present invention.

Thus each of the two compound convergent members preferably includes a contact surface of negative power. Such contact surface, in one at least of the two members, is preferably cemented, in which case the mean refractive indices of the materials used for the elements on either side of the surface should differ from one another by more than .04 and less than .30. The contact surface in the front compound convergent member is preferably concave to the front with radius of curvature between 0.6 and 2.0 times the equivalent focal length of the objective. The contact surface in the second compound convergent member may be concave or convex to the front, its radius of curvature preferably being in the former case not less than half the equivalent focal length of the objective and in the latter case not less than such equivalent focal length.

The front surface of the front compound convergent member is preferably convex to the front with radius of curvature between .35 and .75 times the equivalent focal length of the objective, and the front surface of the second compound convergent member may also be convex to the front with radius of curvature between .3 and .5 times such equivalent focal length.

The divergent rear member may be arranged in any of the ways described in the prior specification above mentioned. The front surface of such member is preferably convex to the front, and its rear surface may also be convex to the front with radius of curvature between .125 and .35 times the equivalent focal length of the objective. In a preferred form the divergent rear member is compounded of two elements having a contact surface concave to the front, the mean refractive indices of the materials used for its two elements preferably each being greater than 1.6 and differing from one another by less than .01.

Figure 2:
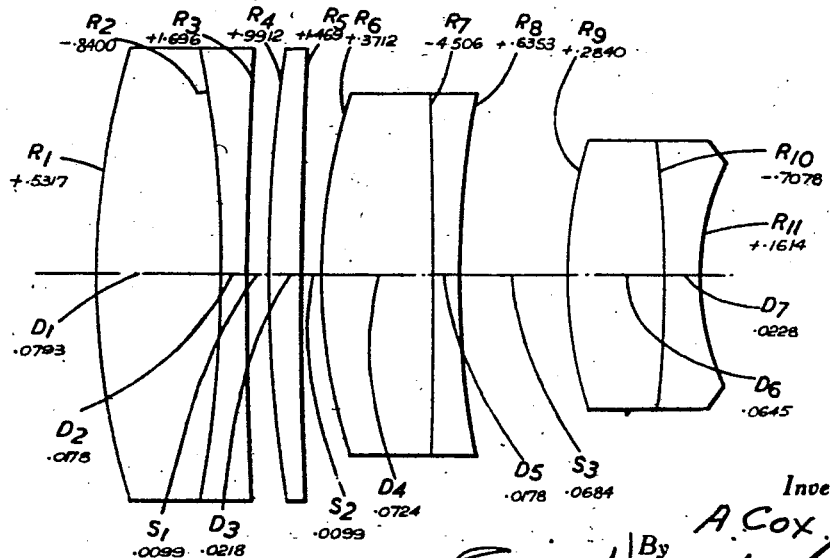

Figures 1 and 2 of the accompanying drawing respectively illustrate two convenient practical examples of objective according to the invention. Numerical data for these examples are given in the following tables, in which $R_1$ $R_2$ . . . represent the radii of curvature of the individual surfaces counting from the front (the positive sign indicating that the surface is convex to the front and the negative sign that it is concave thereto), $D_1$ $D_2$ . . . represent the axial thicknesses of the individual elements, and $S_1$ $S_2$ represent the axial air separations of the members from one another. The tables also give the mean refractive index $n_D$ (for the D-line) and the Abbé V number of the material used for each element.

*Example I*

| Equivalent focal length 1.000 | | Relative aperture F/2.5 | |
|---|---|---|---|
| Radius | Thickness or air separation | Refractive index $n_D$ | Abbé V number |
| $R_1$+1.668 | $D_1$ .0150 | 1.613 | 59.3 |
| $R_2$+3.337 | $S_1$ 0 | | |
| $R_3$+.4551 | $D_2$ .0801 | 1.613 | 59.3 |
| $R_4$−1.177 | $D_3$ .0180 | 1.699 | 30.5 |
| $R_5$+1.299 | $S_2$ 0 | | |
| $R_6$+.4035 | $D_4$ .0801 | 1.613 | 59.3 |
| $R_7$−4.315 | $D_5$ .0180 | 1.699 | 30.5 |
| $R_8$+.6217 | $S_3$ .0611 | | |
| $R_9$+.2814 | $D_6$ .0651 | 1.647 | 33.9 |
| $R_{10}$−.7009 | $D_7$ .0230 | 1.644 | 48.3 |
| $R_{11}$+.1628 | | | |

*Example II*

| Equivalent focal length 1.000 | | Relative aperture F/2.5 | |
|---|---|---|---|
| Radius | Thickness or air separation | Refractive index $n_D$ | Abbé V number |
| $R_1$+.5317 | $D_1$ .0793 | 1.613 | 57.6 |
| $R_2$−.8400 | $D_2$ .0178 | 1.699 | 30.5 |
| $R_3$+1.696 | $S_1$ .0099 | | |
| $R_4$+.9912 | $D_3$ .0218 | 1.644 | 48.3 |
| $R_5$+1.469 | $S_2$ .0099 | | |
| $R_6$+.3712 | $D_4$ .0724 | 1.613 | 57.6 |
| $R_7$−4.506 | $D_5$ .0178 | 1.699 | 30.5 |
| $R_8$+.6353 | $S_3$ .0684 | | |
| $R_9$+.2840 | $D_6$ .0645 | 1.647 | 33.9 |
| $D_{10}$−.7078 | $D_7$ .0228 | 1.644 | 48.3 |
| $R_{11}$+.1614 | | | |

In both these examples the convergent system consists of two convergent doublets and a simple convergent member, and the examples differ from one another primarily in that the simple member is in front of the two doublets in Example I and between the two doublets in Example II. The overall axial length of the convergent system is .2112 times the equivalent focal length of the objective in Example I and .2289 times such equivalent focal length in Example II.

The contact surfaces in the convergent doublets are cemented in both examples and in each case the refractive index difference across the surface is .086. The contact surfaces in both doublets are concave to the front in each example. The front surfaces of both doublets are convex to the front in each example.

In both examples the divergent rear member is in the form of a cemented doublet with its front and rear surfaces convex to the front and its contact surface concave to the front, the refractive index difference across such contact surface being .003.

What I claim as my invention and declare to secure by Letters Patent is:

1. A telephoto objective, corrected for spherical and chromatic aberrations, coma, astigmatism and field curvature, and comprising a compound divergent member, and a convergent system which is disposed in front of the divergent member and consists of two compound convergent members and one simple member, the three axial air spaces separating the four members each being less than one-eighth of the equivalent focal length of the objective.

2. A telephoto objective, corrected for spherical and chromatic aberrations, coma, astigmatism and field curvature, and comprising a compound divergent member, and a convergent system which is disposed in front of the divergent member and consists of two compound convergent members and one simple member disposed in front of the two compound members, the three axial air spaces separating the four members each being less than one-eighth of the equivalent focal length of the objective.

3. A telephoto objective, corrected for spherical and chromatic aberrations, coma, astigmatism and field curvature, and comprising a compound divergent member, and a convergent system which is disposed in front of the divergent member and consists of two compound convergent members and one simple member disposed between the two compound members, the three axial air spaces separating the four members each being less than one-eighth of the equivalent focal length of the objective.

4. A telephoto objective as claimed in claim 1, in which the overall axial length of the convergent system lies between .15 and .35 times the equivalent focal length of the objective.

5. A telephoto objective as claimed in claim 1, in which each compound convergent member includes a contact surface of negative power.

6. A telephoto objective, corrected for spherical and chromatic aberrations, coma, astigmatism and field curvature, and comprising a compound divergent member, and a convergent system which is disposed in front of the divergent member and has overall axial length between .15 and .35 times the equivalent focal length of the objective, such convergent system consisting of two compound convergent members each including a contact surface of negative power and one simple member disposed in front of the two compound members, the three axial air spaces separating the four members each being less than one-eighth of the equivalent focal length of the objective.

7. A telephoto objective, corrected for spherical and chromatic aberrations, coma, astigmatism and field curvature, and comprising a compound divergent member, and a convergent system which is disposed in front of the divergent member and has overall axial length between .15 and .35 times the equivalent focal length of the objective, such convergent system consisting of two compound convergent members each including a contact surface of negative power and one simple member disposed between the two compound members, the three axial air spaces separating the four members each being less than one-eighth of the equivalent focal length of the objective.

8. A telephoto objective as claimed in claim 1, in which each compound convergent member includes a contact surface of negative power, such contact surface in the front compound convergent member being concave to the front and having radius of curvature between 0.6 and 2.0 times the equivalent focal length of the objective.

9. A telephoto objective as claimed in claim 1, in which each compound convergent member includes a contact surface of negative power, and the radius of curvature of such contact surface in the second compound convergent member lies within a range extending on both sides of the flat and is not less than half the equivalent focal length of the objective if concave to the front and not less than such equivalent focal length if convex to the front.

10. A telephoto objective as claimed in claim 6, in which each compound convergent member includes a contact surface of negative power, such contact surface in the front compound convergent member being concave to the front and having radius of curvature between 0.6 and 2.0 times the equivalent focal length of the objective whilst the radius of curvature of such contact surface in the second compound convergent member lies within a range extending on both sides of the flat and is not less than half the equivalent focal length of the objective if concave to the front and not less than such equivalent focal length if convex to the front.

11. A telephoto objective as claimed in claim 7, in which each compound convergent member includes a contact surface of negative power, such contact surface in the front compound convergent member being concave to the front and having radius of curvature between 0.6 and 2.0 times the equivalent focal length of the objective whilst the radius of curvature of such contact surface in the second compound convergent member lies within a range extending on both sides of the flat and is not less than half the equivalent focal length of the objective if concave to the front and not less than such equivalent focal length if convex to the front.

12. A telephoto objective as claimed in claim 1, in which each compound convergent member includes a contact surface of negative power, at least one of such contact surfaces being cemented, the mean refractive indices of the materials used for the elements on either side of such cemented contact surface differing from one another by more than .04 and less than .30.

13. A telephoto objective as claimed in claim 2, in which each compound convergent member includes a cemented contact surface of negative power, the mean refractive indices of the materials used for the elements on either side of each such cemented surface differing from one another by more than .04 and less than .30.

14. A telephoto objective as claimed in claim 3, in which each compound convergent member includes a cemented contact surface of negative power, the mean refractive indices of the materials used for the elements on either side of each such cemented surface differing from one another by more than .04 and less than .30.

15. A telephoto objective as claimed in claim 1, in which the front surface of the front compound convergent member is convex to the front and has radius of curvature between .35 and .75 times the equivalent focal length of the objective.

16. A telephoto objective as claimed in claim 1, in which the front surface of the second compound convergent member is convex to the front and has radius of curvature between .3 and .5 times the equivalent focal length of the objective.

17. A telephoto objective as claimed in claim 2, in which the front surfaces of the two compound convergent members are convex to the front, the front surface of the front compound convergent member having radius of curvature between .35 and .75 times the equivalent focal length of the objective, whilst the front surface of the second compound convergent member has radius of curvature between .3 and .5 times such equivalent focal length.

18. A telephoto objective as claimed in claim 3, in which the front surfaces of the two compound convergent members are convex to the front, the front surface of the front compound convergent member having radius of curvature between .35 and .75 times the equivalent focal length of the objective, whilst the front surface of the second compound convergent member has radius of curvature between .3 and .5 times such equivalent focal length.

19. A telephoto objective as claimed in claim 1, in which the front surface of the divergent rear member is convex to the front.

20. A telephoto objective as claimed in claim 1, in which the rear surface of the divergent rear member is convex to the front and has radius of curvature between .125 and .35 times the equivalent focal length of the objective.

21. A telephoto objective as claimed in claim 2, in which the front and rear surfaces of the divergent rear member are convex to the front, the rear surface having radius of curvature between .125 and .35 times the equivalent focal length of the objective.

22. A telephoto objective as claimed in claim 3, in which the front and rear surfaces of the divergent rear member are convex to the front, the rear surface having radius of curvature between .125 and .35 times the equivalent focal length of the objective.

23. A telephoto objective as claimed in claim 1, in which the divergent rear member is compounded of two elements having a contact surface concave to the front, the mean refractive indices of the materials used for such two elements being greater than 1.6 and differing from one another by less than .01.

24. A telephoto objective as claimed in claim 6, in which the divergent rear member has its front and rear surfaces convex to the front and is compounded of two elements having a contact surface concave to the front, the mean refractive indices of the materials used for such two elements being greater than 1.6 and differing from one another by less than .01.

25. A telephoto objective as claimed in claim 7, in which the divergent rear member has its front and rear surfaces convex to the front and is compounded of two elements having a contact surface concave to the front, the mean refractive indices of the materials used for such two elements being greater than 1.6 and differing from one another by less than .01.

26. A telephoto objective having numerical data substantially as set forth in the following table:

| Equivalent focal length 1.000 | | Relative aperture F/2.5 | |
|---|---|---|---|
| Radius | Thickness or air separation | Refractive index $n_D$ | Abbé V number |
| $R_1 +1.668$ | $D_1$ .0150 | 1.613 | 59.3 |
| $R_2 +3.337$ | $S_1$ 0 | | |
| $R_3 +.4551$ | $D_2$ .0801 | 1.613 | 59.3 |
| $R_4 -1.177$ | $D_3$ .0180 | 1.699 | 30.5 |
| $R_5 +1.299$ | $S_2$ 0 | | |
| $R_6 +.4035$ | $D_4$ .0801 | 1.613 | 59.3 |
| $R_7 -4.315$ | $D_5$ .0180 | 1.699 | 30.5 |
| $R_8 +.6217$ | $S_3$ .0611 | | |
| $R_9 +.2814$ | $D_6$ .0651 | 1.647 | 33.9 |
| $R_{10} -.7009$ | $D_7$ .0230 | 1.644 | 48.3 |
| $R_{11} +.1628$ | | | | wherein $R_1$ $R_2$ ... represent the radii of curvature of the individual surfaces counting from the front (the positive sign indicating that the surface is convex to the front and the negative sign that it is concave thereto), $D_1$ $D_2$ ... represent the axial thicknesses of the individual elements, and $S_1$ $S_2$ represent the axial air separations of the members from one another.

27. A telephoto objective having numerical data substantially as set forth in the following table:

| Equivalent focal length 1.000 | | Relative aperture F/2.5 | |
|---|---|---|---|
| Radius | Thickness or air separation | Refractive index $n_D$ | Abbé V number |
| $R_1 +.5317$ | $D_1$ .0793 | 1.613 | 57.6 |
| $R_2 -.8400$ | $D_2$ .0178 | 1.699 | 30.5 |
| $R_3 +1.696$ | $S_1$ .0099 | | |
| $R_4 +.9912$ | $D_3$ .0218 | 1.644 | 48.3 |
| $R_5 +1.469$ | $S_2$ .0099 | | |
| $R_6 +.3712$ | $D_4$ .0724 | 1.613 | 57.6 |
| $R_7 -4.506$ | $D_5$ .0178 | 1.699 | 30.5 |
| $R_8 +.6353$ | $S_3$ .0684 | | |
| $R_9 +.2840$ | $D_6$ .0645 | 1.647 | 33.9 |
| $R_{10} -.7078$ | $D_7$ .0228 | 1.644 | 48.3 |
| $R_{11} +.1614$ | | | | wherein $R_1$ $R_2$ ... represent the radii of curvature of the individual surfaces counting from the front (the positive sign indicating that the surface is convex to the front and the negative sign that it is concave thereto), $D_1$ $D_2$ ... represent the axial thicknesses of the individual elements, and $S_1$ $S_2$ represent the axial air separations of the members from one another.

ARTHUR COX.